Jan. 19, 1971  P. F. LEVY  3,556,865
MECHANICALLY STABLE THERMOCOUPLE
AND METHOD FOR MAKING THE SAME
Filed Dec. 28, 1966

INVENTOR
PAUL F. LEVY,
BY
AGENT

United States Patent Office 3,556,865
Patented Jan. 19, 1971

3,556,865
MECHANICALLY STABLE THERMOCOUPLE AND METHOD FOR MAKING THE SAME
Paul F. Levy, Wilmington, Del., assignor to E. I. du Pont de Nemours and Company, Wilmington, Del., a corporation of Delaware
Filed Dec. 28, 1966, Ser. No. 605,250
Int. Cl. H01v 1/04, 1/06
U.S. Cl. 136—233
8 Claims

ABSTRACT OF THE DISCLOSURE

A thermocouple constructed by heating a thermojunction weld and an adjacent support member with either a hydrogen-oxygen torch or a "Heliarc" welding device until the weld is melted into the holes in the support member or until the weld penetrates the holes of the support member and the support member partially or totally encapsulates the weld.

BACKGROUND OF THE INVENTION

In the prior art, cement and mechanical joints are used to provide rigidity between the thermojunction weld and the support member. However, after successive heating and cooling cycles, especially at high temperatures, these joints lose mechanical stability due to stress corrosion, expension stress, or chemical breakdown. Such mechanical rigidity and stability is essential for accuracy and reproduction of data in thermal analysis.

SUMMARY OF THE INVENTION

In accordance with the embodiments of the invention hereinafter described, the metal bead of the thermojunction and the end portion of the ceramic support member are heated until at least the metal bead is melted into the holes of the support member, thereby producing a thermojunction intimately fused to the support member. In the preferred embodiment the dissimilar metal wires are platinum and platinum 13% rhodium and the support member is a ceramic.

For a more detailed understanding of the invention, reference is made to the following description of various embodiments thereof and to the attendant drawings wherein.

Figure 1:
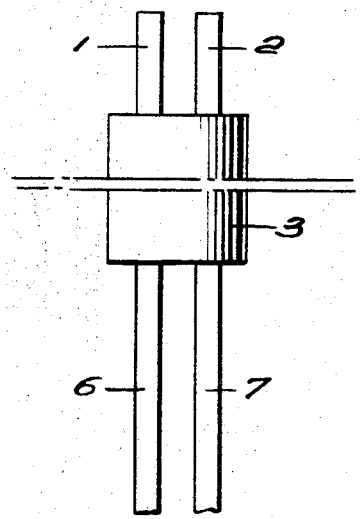
FIG. 1 and FIG. 2 illustrate the bending of the exposed ends of the two dissimilar metal wires of the thermocouple.
Figure 2:
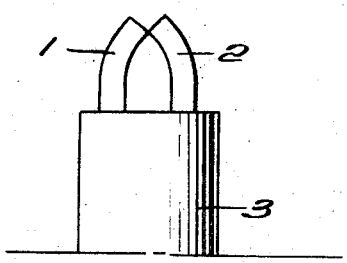

As shown in FIG. 1 dissimilar metal wires 1 and 2 are threaded through support member 3 such that a portion of each wire extends beyond the support member. The metal wires are then symmetrically bent until they touch as illustrated in FIG. 2.

Figure 3:
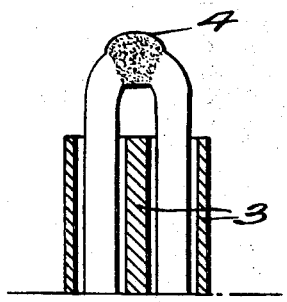
FIG. 3, FIG. 4 and FIG. 5 are sectional views of the thermojunction weld at successive intervals of the heating process incorporated in an embodiment of the invention.
Figure 4:
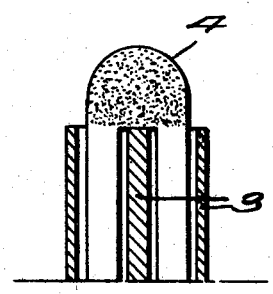
Figure 5:
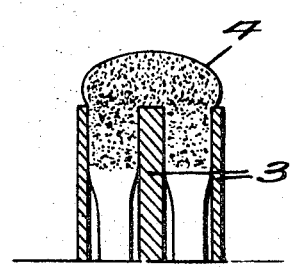

In one embodiment of the invention the extended wires are welded together forming bead 4 (FIG. 3), followed by further heating until reasonably hemispherical bead 4 is setting on the support member as depicted in FIG. 4. Subsequent heating produces a mechanically stable thermojunction weld, FIG. 5, wherein the aforementioned bead is melted into the holes in the support member. This embodiment is preferably obtained by using a hydrogen-oxygen torch equipped with a short nosed hypodermic needle.

Figure 6:
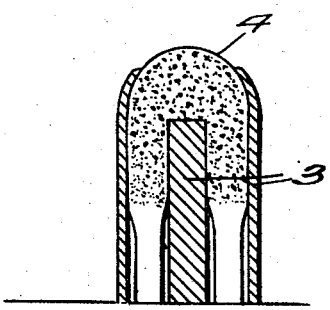
FIG. 6 and FIG. 7 are sectional views of the thermojunction weld at successive intervals of the heating process incorporated in another embodiment of the invention.
Figure 7:
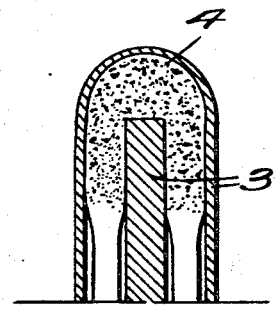

In another embodiment of the invention the thermocouple (FIG. 2) is heated at a temperature sufficient to melt dissimilar metal wires 1 and 2 and support member 3 until thermojunction weld 4, penetrating the holes of said support member, is formed and partially encapsulated by the support member as illustrated in FIG. 6. Further heating produces a thermocouple such as shown in FIG. 7 wherein a thin shell of support member 3 covers thermojunction weld 4. The thermocouple in FIG. 7 is particularly advantageous under corrosive conditions where time response is not a critical factor. These operations are preferably accomplished by subjecting the aforementioned thermocouple to a conventional "Heliarc" welding process in an inert atmosphere.

By a proper choice of dissimilar metal wires and support member in the aforementioned embodiments the second step, wherein the ends of said dissimilar wires are symmetrically bent until they touch, may be partially or totally eliminated. The ends of said dissimilar metal wires must only be adapted such that upon heating said ends touch.

It is readily apparent to one skilled in the art subsequent utilization of the now formed mechanically stable thermojunction weld requires, inter alia, that end portions 6 and 7 of the dissimilar metal wires terminate in an appropriate conventional electrical indicating, recording, or measuring instrument.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:
1. An improved thermocouple comprising:
   (a) an electrically insulating tubular support member having two openings extending the length thereof;
   (b) two dissimilar metal wires traversing said two openings; and
   (c) a thermojunction weld formed from the materials of said dissimilar metal wires rigidly fixed relative to said support member as a continuation of said dissimilar metal wires disposed at the end of said support member and extending into and at least partially filling the adjacent portion of said openings in said support member said thermojunction weld being at least partially encapsulated solely by said support member.
2. The improved thermocouple of claim 1 wherein said support member is a ceramic and said dissimilar metal wires are of platinum and of platinum-13% rhodium.
3. The improved thermocouple of claim 1 wherein said thermojunction weld is completely encapsulated by said support member.
4. The improved thermocouple of claim 3 wherein said support member is a ceramic and said dissimilar metal wires are of platinum and of platinum-13% rhodium.
5. A method for making an improved thermocouple comprising:
   (a) threading two dissimilar metal wires respectively through each of two openings in an electrically insulating support member to provide two exposed ends;
   (b) adapting the exposed ends of each of said wires such that, upon heating, said ends touch;
   (c) heating said exposed ends to provide a substantially hemispherical bead from said exposed ends of said wire, said bead being of a mixture of said dissimilar metals; and
   (d) further heating to cause said bead to at least partially fill said openings in said support member with said mixture and to provide an exposed bead, and to further cause said support member to melt and at least partially encapsulate said exposed bead.

6. A method as in claim 5 wherein said support member is ceramic and said dissimilar metal wires are of platinum and of platinum-13% rhodium.

7. A method as in claim 5 wherein said heating causes said support members to completely encapsulate said exposed bead.

8. A method as in claim 7 wherein said support member is ceramic and said dissimilar metal wires are of platinum and of platinum-13% rhodium.

References Cited

UNITED STATES PATENTS

| | | | |
|---|---|---|---|
| 1,605,860 | 11/1926 | Snelling | 136—224X |
| 2,289,455 | 7/1942 | Ray | 136—232 |
| 3,015,234 | 1/1962 | Springfield | 136—232X |
| 3,048,641 | 8/1962 | Erlebacher | 136—232 |
| 3,143,439 | 8/1964 | Hansen | 136—229 |
| 3,338,752 | 8/1967 | Finney | 136—233 |
| 3,353,260 | 11/1967 | Davis et al. | 136—205 |
| 3,379,578 | 4/1968 | McTaggart et al. | 136—234 |

FOREIGN PATENTS

| | | | |
|---|---|---|---|
| 854,570 | 11/1960 | Great Britain | 136—233 |
| 1,051,146 | 12/1966 | Great Britain | 29—573 |
| 1,365,923 | 5/1964 | France | 136—201 |

WINSTON A. DOUGLAS, Primary Examiner

M. J. ANDREWS, Assistant Examiner

U.S. Cl. X.R.

136—201